(12) United States Patent
Abe et al.

(10) Patent No.: US 10,212,067 B2
(45) Date of Patent: *Feb. 19, 2019

(54) DYNAMIC SYMBOLIC LINKS FOR REFERENCING IN A FILE SYSTEM

(71) Applicant: International Business Machines Corporation, Armonk, NY (US)

(72) Inventors: Atsushi Abe, Ebina (JP); David A. Pease, San Jose, CA (US); Lucas C. Villa Real, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,612

(22) Filed: Oct. 19, 2017

(65) Prior Publication Data

US 2018/0041418 A1    Feb. 8, 2018

Related U.S. Application Data

(63) Continuation of application No. 14/050,255, filed on Oct. 9, 2013, now Pat. No. 9,819,570.

(51) Int. Cl.
*H04L 12/751* (2013.01)

(52) U.S. Cl.
CPC .................. *H04L 45/02* (2013.01)

(58) Field of Classification Search
CPC ..................................... H04L 45/02
See application file for complete search history.

(56) References Cited

U.S. PATENT DOCUMENTS

| 6,370,545 | B1 | 4/2002 | Shaath | |
| 6,704,320 | B1 * | 3/2004 | Narvaez | H04L 45/02 370/408 |
| 6,968,345 | B1 * | 11/2005 | Muhlestein | G06F 17/30067 707/824 |
| 7,159,005 | B1 * | 1/2007 | Baber | H04L 67/06 709/200 |
| 7,340,444 | B2 | 3/2008 | Hipp | |

(Continued)

FOREIGN PATENT DOCUMENTS

| EP | 1808784 A2 * | 7/2007 | ........ G06F 17/30091 |
| EP | 1808784 A2 | 7/2007 | |

OTHER PUBLICATIONS

Abe et al., U.S. Appl. No. 14/050,255, filed Oct. 9, 2013.

(Continued)

*Primary Examiner* — Uzma Alam
(74) *Attorney, Agent, or Firm* — Zilka-Kotah, P.C.

(57) ABSTRACT

Various embodiments relate to providing dynamic absolute-path symbolic links. According to one embodiment, indication of a symbolic link is received, which references a target, the indication including an absolute path of the target that includes a target mount point and a name of the target. A current mount point of the target is identified, and a verification is made that the target mount point is identical to the current mount point. When the target mount point is identical to the current mount point, a string length of the current mount point is determined, and an in-memory record of the symbolic link is created. The in-memory record includes the string length of the current mount point associated with the symbolic link.

18 Claims, 6 Drawing Sheets

(56) References Cited

U.S. PATENT DOCUMENTS

| | | | | |
|---|---|---|---|---|
| 8,250,652 | B1* | 8/2012 | Powell | G06F 21/566 |
| | | | | 726/22 |
| 8,943,513 | B2* | 1/2015 | Ulrich | G06F 17/30067 |
| | | | | 709/226 |
| 9,819,570 | B2 | 11/2017 | Abe et al. | |
| 2002/0049697 | A1* | 4/2002 | Nakano | G06F 8/20 |
| 2002/0078335 | A1* | 6/2002 | Cabrera | G06F 3/0607 |
| | | | | 713/1 |
| 2002/0162013 | A1* | 10/2002 | Burnett | G06F 21/6218 |
| | | | | 726/27 |
| 2002/0174330 | A1* | 11/2002 | Cabrera | G06F 3/0607 |
| | | | | 713/100 |
| 2002/0194526 | A1* | 12/2002 | Ulrich | G06F 3/061 |
| | | | | 714/6.12 |
| 2005/0256914 | A1* | 11/2005 | Bailey | G06F 17/30067 |
| | | | | 708/1 |
| 2007/0162419 | A1* | 7/2007 | Ahn | G06F 17/30091 |
| 2007/0294362 | A1* | 12/2007 | Patel | G06F 8/65 |
| | | | | 709/217 |
| 2008/0160492 | A1* | 7/2008 | Campbell | G09B 5/06 |
| | | | | 434/379 |
| 2009/0271412 | A1* | 10/2009 | Lacapra | G06F 17/30206 |
| 2013/0111561 | A1* | 5/2013 | Kaushik | H04L 63/105 |
| | | | | 726/4 |
| 2013/0263105 | A1* | 10/2013 | Cornwell | G06F 8/654 |
| | | | | 717/168 |
| 2015/0100705 | A1 | 4/2015 | Abe et al. | |

OTHER PUBLICATIONS

Non-Final Office Action from U.S. Appl. No. 14/050,255, dated Sep. 25, 2015.
Non-Final Office Action from U.S. Appl. No. 14/050,255, dated Apr. 21, 2016.
Final Office Action from U.S. Appl. No. 14/050,255, dated Oct. 19, 2016.
Non-Final Office Action from U.S. Appl. No. 14/050,255, dated Jan. 30, 2017.
Notice of Allowance from U.S. Appl. No. 14/050,255, dated Jul. 6, 2017.

* cited by examiner

DYNAMIC SYMBOLIC LINKS FOR REFERENCING IN A FILE SYSTEM

BACKGROUND

The present invention relates to file systems, and more particularly, this invention relates to dynamic symbolic links which may be used in file systems.

In a file system, symbolic links (also known as "symlinks") are a special type of file used to create references to other file(s) and/or directory(ies) which are physically or logically stored in the storage system. These file(s) and/or directory(ies) are called the target of the symbolic link. When a symbolic link is opened by an application, the file system automatically redirects the operation to its target, unless the application's open system call states that symbolic links are not to be followed. One particular characteristic of symbolic links is that their targets do not need to exist, as it is possible to create symbolic links to non-existing file(s), non-existing directory(ies), and/or to remove the target once the symbolic link has been created. Symbolic links whose target do not exist are referred to as broken links.

The target of a symbolic link may be specified either as a relative path (e.g., linkname→ ../../filename) or as an absolute path (e.g., linkname→/home/user/filename). Therefore, a symbolic link pointing to its target using one or more relative paths may break if a directory component of its path is renamed, moved, etc. The same applies if the symbolic link (the file) is moved to another location within the file system hierarchy, thereby resulting in the path to no longer accurately refer to the location of its target. Additionally, targets represented by absolute paths are guaranteed to remain valid under such operations, as long as the target is not removed and/or the file system where the target is located is not un-mounted and/or re-mounted at a different mount point.

Accordingly, it would be beneficial to have an absolute-path symbolic link which does not break under the above described conditions.

BRIEF SUMMARY

A computer program product for providing dynamic absolute-path symbolic links, according to one embodiment, includes a computer readable storage medium having computer program code embodied therewith, the program code readable/executable by a processor to receive indication of a symbolic link which references a target, the indication including an absolute path of the target, wherein the absolute path comprises a target mount point and a name of the target, identify a current mount point of the target, verify that the target mount point is identical to the current mount point, and in response to a determination that the target mount point is identical to the current mount point: determine a string length of the current mount point, and create an in-memory record of the symbolic link, the in-memory record comprising the string length of the current mount point associated with the symbolic link. The program code is also readable/executable by the processor to receive a request to utilize the symbolic link, the symbolic link comprising a second absolute path with an outdated target mount point, determine whether an in-memory record exists for the symbolic link, and return the second absolute path in response to a determination that the in-memory record is empty or does not exist.

A computer program product for using dynamic absolute-path symbolic links, according to one embodiment, includes a computer readable storage medium having computer program code embodied therewith, the program code readable/executable by a processor to receive a request to utilize a symbolic link which references a target using an absolute path, the absolute path comprising a target mount point and a name of the target, determine whether an in-memory record exists for the symbolic link, return the absolute path in response to a determination that the in-memory record is empty or does not exist, and in response to a determination that the in-memory record is non-empty: replace the target mount point from the absolute path with a current mount point to form a modified absolute path and return the modified absolute path. The program code is also readable/executable by the processor to receive a request to utilize the symbolic link, the symbolic link comprising a second absolute path with an outdated target mount point, determine whether an in-memory record exists for the symbolic link, and return the second absolute path in response to a determination that the in-memory record is empty or does not exist.

A computer-implemented method for providing dynamic absolute-path symbolic links, according to one embodiment, includes receiving a request to utilize a symbolic link which references a target using an absolute path with an outdated target mount point, determining whether an in-memory record exists for the symbolic link, and in response to determining that the in-memory record is non-empty: replacing the outdated target mount point from the absolute path with a current mount point to form a modified absolute path, and returning the modified absolute path.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of file systems, as well as operation and/or component parts thereof. In one embodiment, a file system is configured to use absolute-path symbolic links ("symlinks") which allow their targets to remain valid even when media is re-mounted at a different mount point in the same or a different system. Furthermore, these absolute-path symbolic links remain valid when using removable media, such as magnetic or optical tapes, Blu-Ray Disks, DVD-ROMs, CD-ROMs, etc.

In one general embodiment, a computer program product for providing dynamic absolute-path symbolic links includes a computer readable storage medium having computer program code embodied therewith. The program code is readable/executable by a processor to: receive indication of a symbolic link which references a target, the indication including an absolute path of the target, wherein the absolute path comprises a target mount point and a name of the target; identify a current mount point of the target; and verify that the target mount point is identical to the current mount point. When the target mount point is identical to the current mount point, the program code is readable/executable by a processor to: determine a string length of the current mount point, and create an in-memory record of the symbolic link, the in-memory record comprising the string length of the current mount point associated with the symbolic link.

In another general embodiment, a computer program product for using dynamic absolute-path symbolic links includes a computer readable storage medium having computer program code embodied therewith. The program code is readable/executable by a processor to: receive a request to utilize a symbolic link which references a target using an absolute path, the absolute path comprising a target mount point and a name of the target; and determine whether an in-memory record exists for the symbolic link; return the absolute path when the in-memory record is empty or does not exist. When the in-memory record is non-empty, the program code is readable/executable by a processor to replace the target mount point from the absolute path with a current mount point to form a modified absolute path, and return the modified absolute path.

In yet another general embodiment, a system configured to provide dynamic absolute-path symbolic links includes a processor and logic integrated with and/or executable by the processor. The logic is configured to cause the processor to: receive indication of a symbolic link which references a target, the indication including an absolute path of the target, wherein the absolute path comprises a target mount point and a name of the target; identify a current mount point of the target; and verify that the target mount point is identical to the current mount point. When the target mount point is identical to the current mount point, the logic is configured to: determine a string length of the current mount point, and create an in-memory record of the symbolic link, the in-memory record comprising the string length of the current mount point associated with the symbolic link. A plurality of in-memory records are stored for a plurality of symbolic links, each updated in-memory record indicating a current mount point for its associated target. The target includes at least one file and/or at least one directory stored on media of a storage system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." For example, one approach may include a processor and logic integrated with and/or executable by the processor, the logic being configured to perform various operations. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
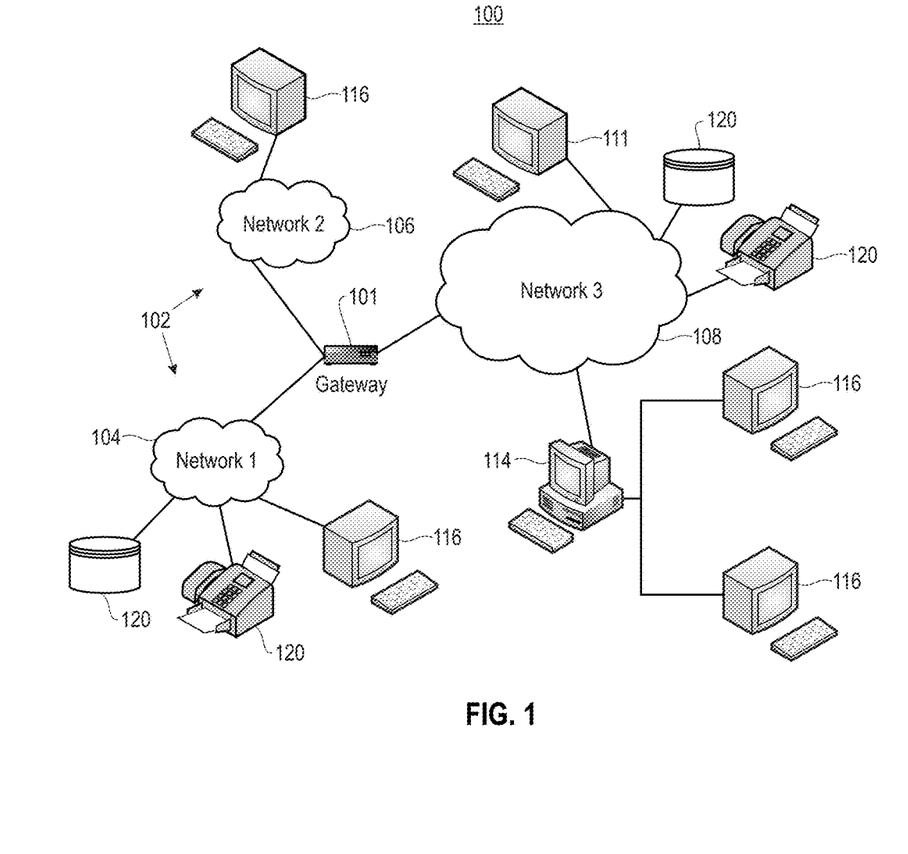
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
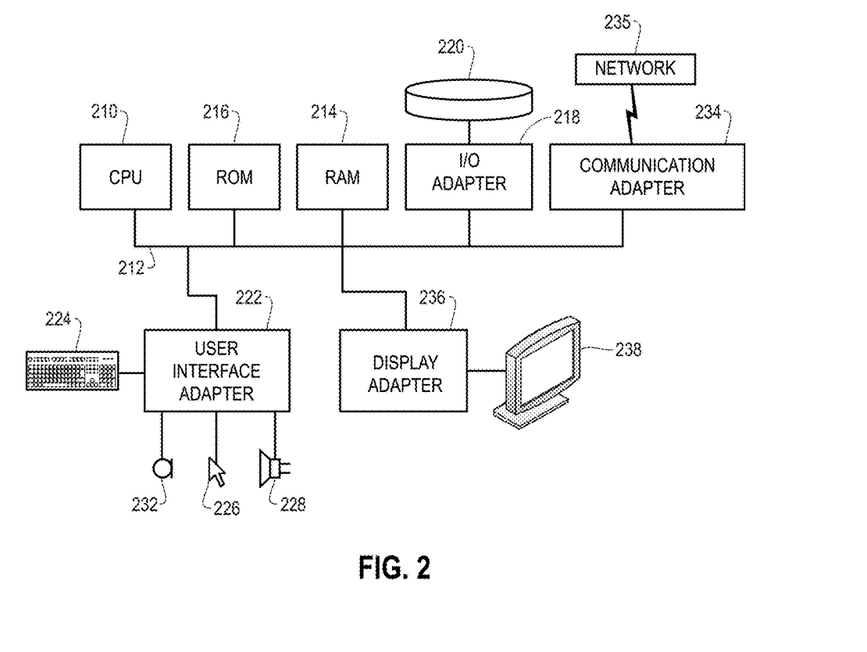
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
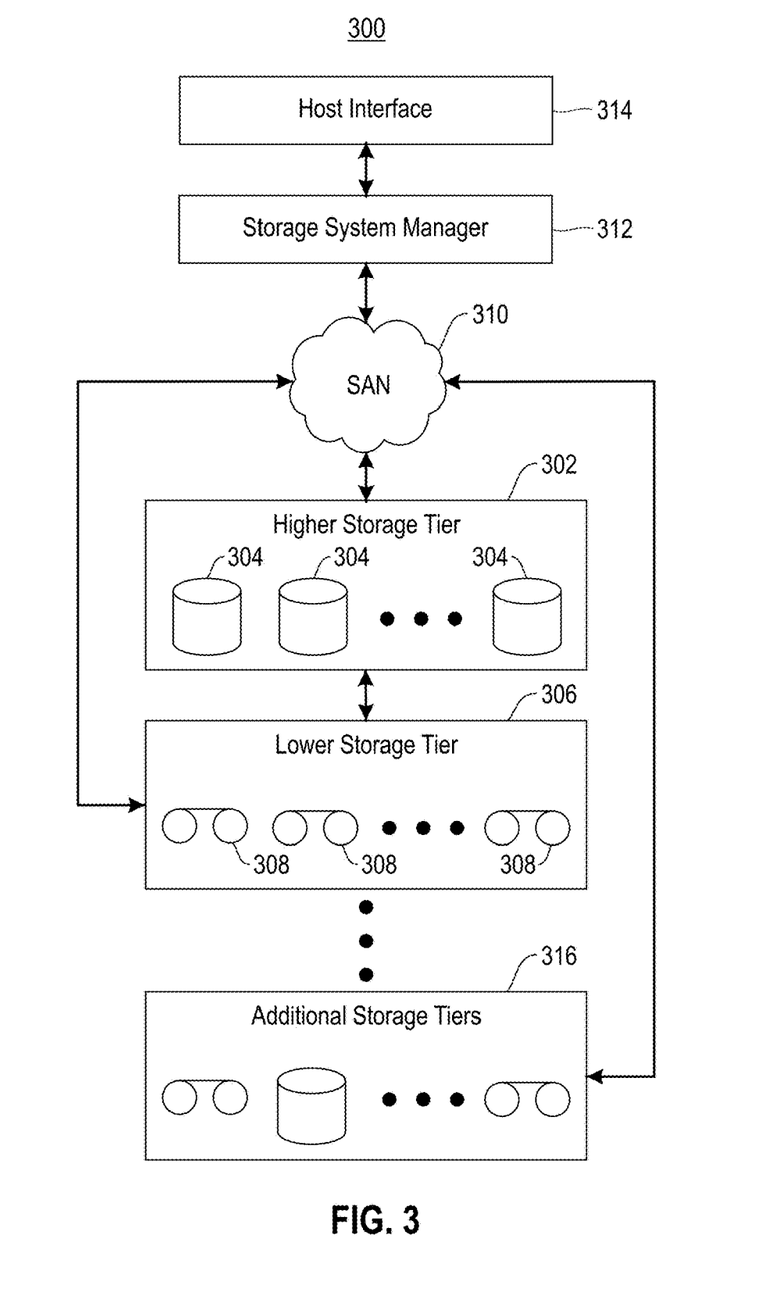
FIG. 3 illustrates a tiered data storage system in accordance with one embodiment.

Now referring to FIG. 3, a storage system 300 is shown according to one embodiment. This storage system 300 may be connected to a file system of a type described herein, according to one embodiment, where the storage system 300 or a storage system similar to storage system 300 is used to store data which may be managed by the file system.

Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
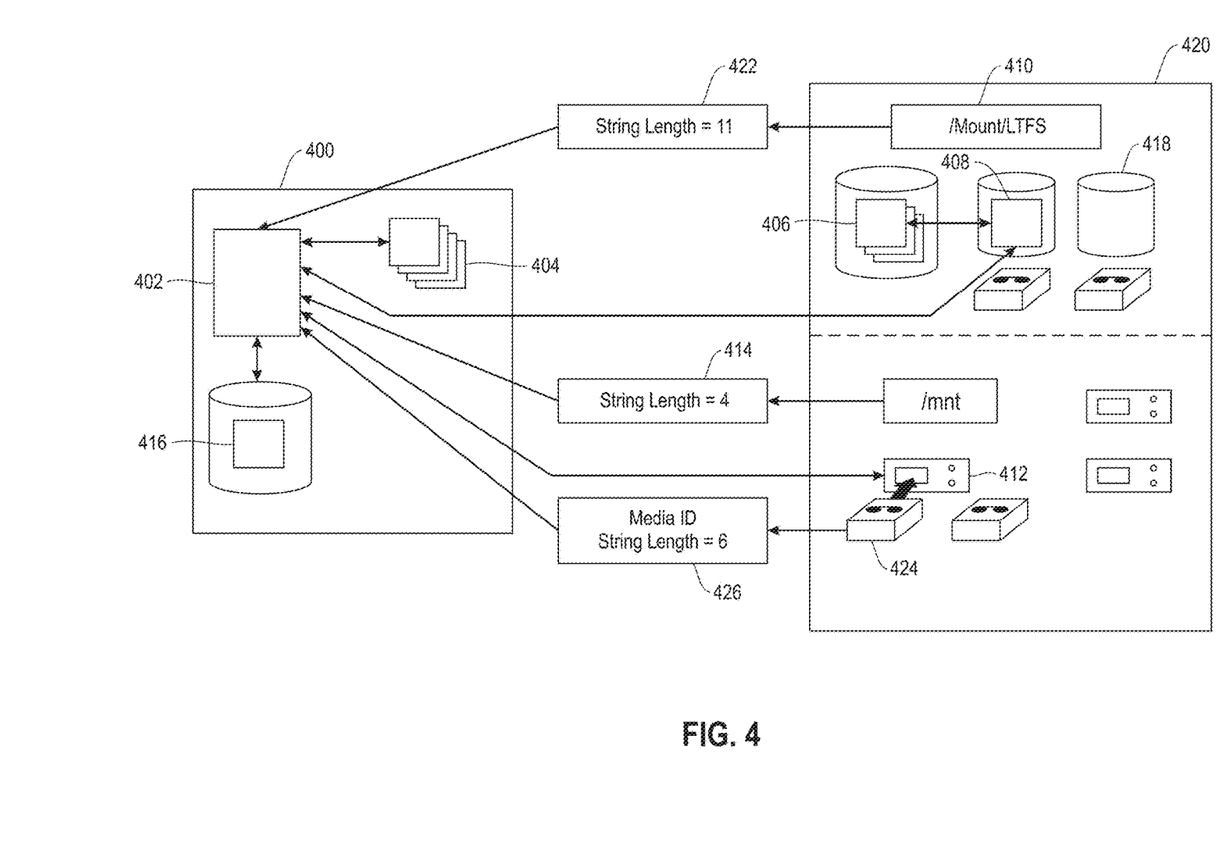
FIG. 4 is simplified diagram of a system, in one embodiment.

Now referring to FIG. 4, a system 400, such as a file system, is shown according to one embodiment, that is configured to provide dynamic absolute-path symbolic links. The system 400 comprises a processor 402 and logic 404 integrated with and/or executable by the processor 402. The logic 404 is configured to cause the processor 402 to perform a variety of tasks and/or functions.

In one embodiment, the logic 404 is configured to cause the processor 402 to receive indication of a symbolic link 408 which references a target 406, the indication including an absolute path of the target 406. The absolute path comprises a target mount point 410 and a name of the target (or some other identifying information about the target 406). The logic 404 is also configured to identify a current mount point 412 of the target 406, and verify that the target mount point 410 is identical to the current mount point 412. When the target mount point 410 is determined to be identical to the current mount point 412, the logic 404 causes the processor to determine a string length 414 of the current mount point 412, and create an in-memory record 416 of the symbolic link 408, the in-memory record 416 comprising at least the string length 414 of the current mount point 412 associated with the symbolic link 408.

By "in-memory," what is meant is that the record is stored on a memory which is resident with and/or always accessible by the processor 402, such that on the event of the target mount point 410 being determined to be different from the current mount point 412, the new (current) mount point 412 does not need to be written back to the media 418. Rather, the modified target 406 is kept in an "in-memory" record which functions as a look-up table, dynamically built and maintained by the system 400. The memory may be any suitable memory type known in the art, such as RAM, ROM, HDD, etc.

In this system 400, according to one embodiment, a plurality of in-memory records 416 may be stored for a plurality of symbolic links 408, with each updated in-memory record 416 indicating a current mount point 412 for its associated target 406. The targets 406, in some approaches, may comprise at least one file and/or at least one directory stored on media 418 of a storage system 420. For example, the media may be a hard disk readable in a hard disk drive (HDD), a magnetic tape cartridge readable in a tape drive, a NVM, a SSD, etc. In some approaches, the media may be removable from a drive or other device capable of accessing data stored to the removable media, such that a mount point of the media may change each time it is accessed and/or when it is accessed from a different drive or device.

By keeping an in-memory record 416 of the "symlink" objects 408 whose targets are specified as an absolute path, these mount point changes may be dynamically accounted for each time the target is to be accessed again in the system 400. If the target object 406 is a file or directory also part of the same file system, then the record 416 indicates how many bytes of the target object 406 name relates to the target mount point 410.

According to one embodiment, the logic 404 configured to cause the processor 402 to verify that the target mount point 410 is identical to the current mount point 412 may be further configured to cause the processor 402 to: compare a string length 422 of the target mount point 410 to a string length 414 of the current mount point 412, and determine that the target mount point 410 is not identical to the current mount point 412 when either string length is different. Of course, when the string lengths match, the converse is not necessarily true, because different strings may have the same string length, but are not identical. Accordingly, after determining that the string lengths match, the actual strings may be compared to confirm that the strings match.

Therefore, in some approaches, the logic 404 configured to cause the processor 402 to verify that the target mount point 410 is identical to the current mount point 412 may be further be configured to cause the processor 402 to determine that the target mount point is not identical to the current mount point when the string length is the same, but a content of the current mount point 412 is different from a content of the target mount point 410, e.g., the current mount point 412 may be "foo" while the target mount point is "old" which have the same string length (3), but different contents (foo versus old).

In another embodiment, the logic 404 may be further configured to cause the processor 402 to update the in-memory record 416 of the symbolic link 408 in response to a change to the current mount point 412 of the target 406 by: determining a string length 414 of the current mount point 412, and updating the in-memory record 416 of the symbolic link 408 with the string length 414 of the current mount point 412.

In another embodiment, the logic 404 may be further configured to cause the processor 402 to: receive a request to the symbolic link 408, the symbolic link 408 comprising a second absolute path with an outdated target mount point, determine whether an in-memory record 416 exists for the symbolic link 408, return the second absolute path when the in-memory record 416 is empty or does not exist, and when the in-memory record 416 is non-empty: replace the outdated target mount point from the second absolute path with the current mount point 412 to form a modified absolute path, and return the modified absolute path.

According to another embodiment, the logic 404 may be further configured to cause the processor 402 to store a length 426 of a media identifier 424 to the in-memory record 416 when the symbolic link 408 includes the media identifier 424. Furthermore, in some approaches, the logic 404 may be further configured to cause the processor 402 to: receive a request to the symbolic link 408, determine whether an in-memory record 416 exists for the symbolic link 408, return the second absolute path when the in-memory record 416 is empty or does not exist, and when the in-memory record 416 is non-empty: replace the outdated target mount point from the second absolute path with the current mount point 412 and the media identifier 424 to form a modified absolute path, and return the modified absolute path.

For example, assuming that a file system mounted on "/Mount/LTFS" is used to create a symlink object called "linkname" which points to "/Mount/LTFS/filename," the record for "linkname" would have the value "11," which is the number of characters in the string "/Mount/LTFS." When the file system is mounted on a different prefix (e.g., "/mnt") in the same or in a different computer, the target of "linkname" would be broken under a normal symlink implementation which utilized absolute pathing, as "filename" is no longer reachable at "/Mount/LTFS/filename" but at "/mnt/filename" instead.

The dynamic symbolic link approach rectifies this deficiency by checking the value of the record for the symlink object "linkname." prior to returning the mount point. Because the stored string length of the target mount point in the record is different than zero (11), the first eleven bytes of the symlink target are replaced by the current file system mount point, effectively translating it from "/Mount/LTFS/filename" to "/mnt/filename," thus allowing the original target object to be reachable through the symlink. This process may be referred to as re-normalization.

Re-normalization is an internal procedure which does not require write access to the file system. The target of the symbolic link is not updated but rather reinterpreted at run time for the symlink. If a symlink record includes a value of zero (or if the record is empty or does not exist) then no re-normalization is performed. In that case the target (via the target mount point) is returned as originally set by the creator of the symbolic link.

In some embodiments, file systems which manage collections of removable media may have ways of identifying each individual media which is more advanced than in non-removable media file systems. Tape cartridges, for instance, may have barcodes, quick response (QR) codes, or some other identifiers that are visible on the tape cartridges that a tape library is able to read. CD-ROMs may have a unique hash identifier computed from their track lengths and number of tracks, such as a CD database (CDDB) ID, etc.

In situations where a collection of such media is managed by the file system and accessible and/or exposed under a single mount point (e.g., "/Mount/LTFS/{Tape1, Tape2, Tape3, Tape4, etc}"), dynamic symbolic linking may utilize an additional field in each record that indicates a string length of the media identifier for each medium unit.

The benefit of using this media identifier is that the file system's volume manager is capable of identifying which media is referenced by a symbolic link and take action to properly load that referenced media when the symlink target is searched, for example.

In one following example, assuming that linkname is "/Mount/LTFS/Tape3/filename," there may be two fields in the symlink record: the first field may have a value of 11 (the string length of "/Mount/LTFS") and a second field may have a value of 6 (the string length of "/Tape3," or whatever particular media the symlink is referencing). Once the symlink called "linkname" is accessed (attempted to be followed), the file system is able to both: a) replace "/Mount/LTFS" with the current mount point (if the current mount point differs from "/Mount/LTFS"), and b) perform actions to make "Tape3" accessible, such as by loading "Tape3" in some available drive (including doing drive provisioning, scheduling, etc.).

According to various embodiments, there may be many different methods of storing the information in the record, along with many different record formats. In one such embodiment, a record may include the following format: [num1:num2], where num1 indicates the length of the mount point and the optional num2 (separated from num1 by a colon or some other suitable separation character, such as a comma, semicolon, etc.) indicates the length of the media identifier. When there is no media identifier, num2 is not included in the record. Furthermore, if the record is empty, then no symbolic link re-normalization is performed for that symlink object.

Any location may be chosen to store the record(s) for a plurality of symlinks, such as (private) extended attributes, a dedicated field within a structure which represents the symbolic link object, etc. According to other embodiments, a different syntax may be used to represent the lengths of the mount point and (possibly) the media identifier.

According to one exemplary embodiment, dynamic symbolic linking may modify the behavior of two internal system calls: 1) symlink (or a corresponding system call on non-UNIX operating systems), and 2) readlink (or a corresponding system call on non-UNIX operating systems).

In the first modification (of a system call), the creation of a symbolic link may result in the creation of an in-memory record that is associated with the symbolic link object (particularly when the symlink target is an absolute path). The file system may be configured to: 1) identify its current mount point (e.g., "/mnt"), 2) verify that the symlink target begins with the identical string as the current mount point (e.g., "/mnt"), 3) when false skip the creation of an in-memory record, 4) create a record with the length of the current mount point (e.g., "4") stored to the record, and 5) when managing multiple volumes (such as removable media) and each volume is uniquely represented under the current mount point, then append a colon to the string length of the mount point and add the length of the volume/media identifier thereto.

In the second modification (of a system call), the file system may be configured to: 1) check if a record exists that is associated with the symlink and verify that the record is non-empty. When the record does not exist or is empty, then return the symlink target as-is (no modification), 2) when the record is in the form of [num1], then replace the first num1 bytes of the target with a current mount point (which is verified at this time), 3) when the record is in the form of [num1:num2], then replace the first num1 bytes of the target with the current mount point and replace the next num2 bytes of the target to: a) identify the volume/media where the target is found and optimize any internal drive/volume schedulers as appropriate, and/or b) update the target string. This may be useful when the target volume is already being exhibited in the file system but using a different label than its volume ID.

Table 1, below, shows an example of using a dynamic symbolic link and how this dynamic symlink may be interpreted by a file system. The first column indicates the name of the target of a symlink, the second column indicates the dynamic symbolic link record data for that symlink, the third column indicates an updated (current) mount point, and the fourth column shows the re-normalized target in a file system that is capable of managing collections of removable media of that kind. The fifth column shows how a file system with the ability to operate just a single media (without the ability to gather or calculate the media ID) would re-normalize that target.

TABLE 1

| Symlink Target | Record | Updated Mount Point | Modified Absolute Path (Media) | Modified Absolute Path |
|---|---|---|---|---|
| /mnt/file | [4] | /Mount | /Mount/[my_tape]/file | /Mount/file |
| /mnt/tape1/file | [4:6] | /Mount/LTFS | /Mount/LTFS/tape1/file | /Mount/LTFS/file |
| /mnt/file2 | [empty] | /Mount | /mnt/file2 | /mnt/file2 |

As shown in Table 1, the updated mount point may be utilized to make current any absolute path in a symlink, such that the symlink does not become broken when media is moved to another mount point, or when entities are renamed in the file system.

Figure 5:
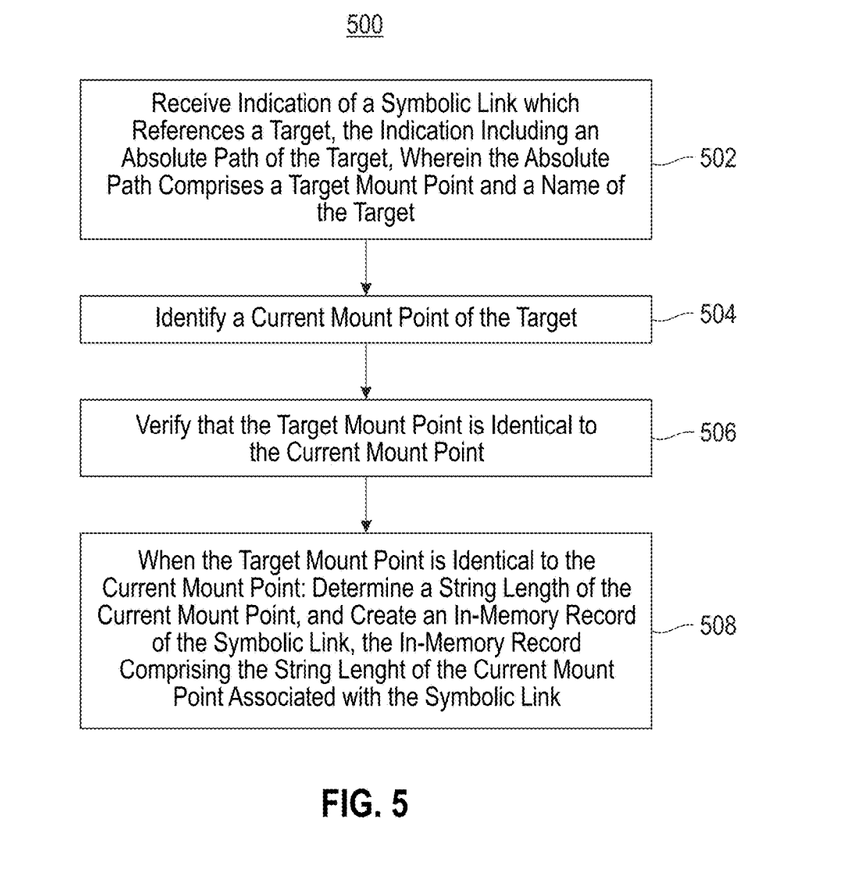
FIG. 5 is flowchart of a method, according to one embodiment.

Now referring to FIG. 5, a method 500 for providing dynamic absolute-path symbolic links is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a networking system, a switch, a router, a processor (such as a CPU, an ASIC, an FPGA, etc.), a server, etc., or any other suitable device or component of a networking system.

As shown in FIG. 5, method 500 may initiate with operation 502, where indication of a symbolic link which references a target is received. The indication includes an absolute path of the target, with the absolute path comprising a target mount point and a name of the target.

The target may comprise at least one file and/or at least one directory stored on media of a storage system.

In operation 504, a current mount point of the target is identified. The current mount point may be determined using any method known in the art.

In operation 506, it is verified that the target mount point is identical to the current mount point. In one embodiment, this verification may include comparing a string length of the target mount point to a string length of the current mount point and determining that the target mount point is not identical to the current mount point when the string length is different. Of course, when the string lengths are the same, more analysis may be performed to verify that the strings are identical, as any two names of the same number of characters would satisfy this examination, such as "foo" and "old" for example. Therefore, when two string lengths are the same, the contents (e.g., names, etc.) are examined more thoroughly to verify whether they are identical or not, such as via character by character comparison, string matching, etc.

In operation 508, when the target mount point is identical to the current mount point: a string length of the current mount point is determined and an in-memory record of the symbolic link is created. The in-memory record comprises the string length of the current mount point associated with the symbolic link.

In one embodiment, method 500 may further include updating the in-memory record of the symbolic link in response to a change to the current mount point of the target by determining a string length of the current mount point, and updating the in-memory record of the symbolic link with the string length of the current mount point.

In another embodiment, method 500 may include receiving a request to the symbolic link, the symbolic link comprising a second absolute path with an outdated target mount point, determining whether an in-memory record exists for the symbolic link, returning the second absolute path when the in-memory record is empty or does not exist, and when the in-memory record is non-empty: replacing the outdated target mount point from the second absolute path with the current mount point to form a modified absolute path, and returning the modified absolute path.

In one approach, a length of a media identifier may be stored to the in-memory record when the symbolic link includes the media identifier, such as for removable media. Then, in some further approaches, method 500 may include receiving a request to the symbolic link, the symbolic link comprising a second absolute path with an outdated target mount point, determining whether an in-memory record exists for the symbolic link, returning the second absolute path when the in-memory record is empty or does not exist, and when the in-memory record is non-empty: replacing the outdated target mount point from the second absolute path with the current mount point and the media identifier to form a modified absolute path, and returning the modified absolute path.

In some approaches, a plurality of in-memory records may be stored for a plurality of symbolic links, each updated in-memory record indicating a current mount point for its associated target.

Figure 6:
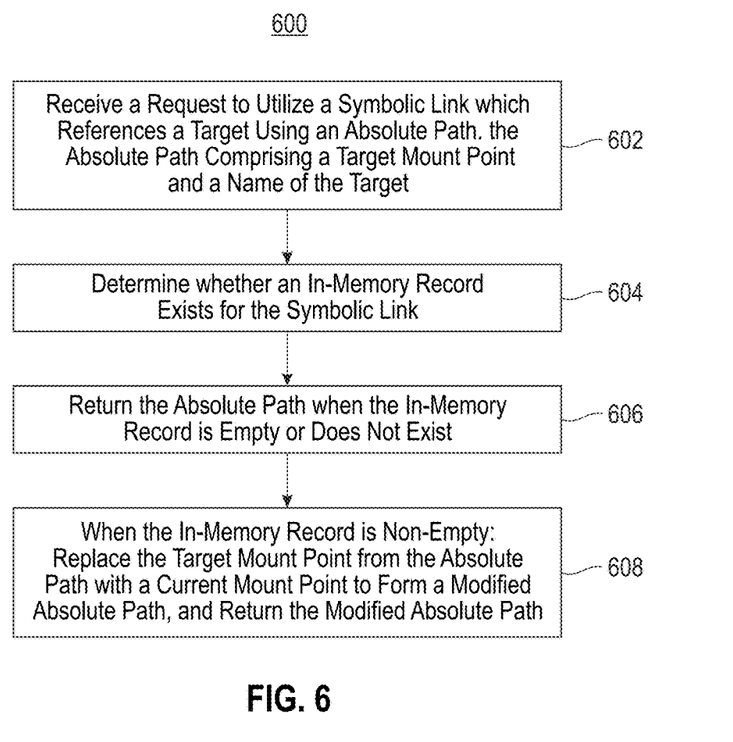
FIG. 6 is flowchart of a method, according to one embodiment.

Now referring to FIG. 6, a method 600 for using dynamic absolute-path symbolic links is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a networking system, a switch, a router, a processor (such as a CPU, an ASIC, an FPGA, etc.), a server, etc., or any other suitable device or component of a networking system.

As shown in FIG. 6, method 600 may initiate with operation 602, where a request to utilize a symbolic link which references a target using an absolute path is received. The absolute path comprises a target mount point and a name of the target.

In operation 604, it is determined whether an in-memory record exists for the symbolic link. This determination may be made using any method known in the art, such as via searching a database, name recognition, querying, etc.

In operation 606, the absolute path is returned when the in-memory record is empty or does not exist. This is performed because there is no indication that the absolute path is incorrect at based on the current configuration.

In operation 608, when the in-memory record is non-empty: the target mount point from the absolute path is replaced with a current mount point to form a modified absolute path, and the modified absolute path is returned. In this case, there is indication that the target mount point is outdated, and therefore it is replaced with the current mount point.

In one approach, method 600 may include receiving indication of the symbolic link, the indication including the absolute path of the target, identifying the current mount point of the target, verifying that the target mount point is identical to the current mount point, and when the target mount point is identical to the current mount point: determining a string length of the current mount point, and creating an in-memory record for the symbolic link, the in-memory record comprising the string length of the current mount point associated with the symbolic link. In a further approach, the verifying that the target mount point is identical to the current mount point may comprise: comparing a string length of the target mount point to a string length of the current mount point, and determining that the target mount point is not identical to the current mount point when the string length is different. Furthermore, in some approaches, when the string lengths match, a further analysis may be performed where it is determined that the target mount point is not identical to the current mount point when the string length is the same, but a content of the current mount point is not the same as a content of the target mount point.

In another approach, a length of a media identifier may be stored to the in-memory record when the symbolic link includes the media identifier.

In another embodiment, when the in-memory record comprises a media identifier, the media identifier may be added to the modified absolute path.

According to another approach, method 600 may further include updating the in-memory record of the symbolic link in response to a change to the current mount point of the target by: determining a string length of the current mount point, and updating the in-memory record of the symbolic link with the string length of the current mount point.

In yet another approach, a plurality of in-memory records may be stored for a plurality of symbolic links, each updated in-memory record indicating a current mount point for its associated target.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for providing dynamic absolute-path symbolic links, the computer program product comprising a non-transitory computer readable storage medium having computer program code embodied therewith, the program code readable/executable by a processor to:
   receive indication of a symbolic link which references a target, the indication including an absolute path of the target, wherein the absolute path comprises a target mount point and a name of the target;
   identify a current mount point of the target;
   verify that the target mount point is identical to the current mount point;
   in response to a determination that the target mount point is identical to the current mount point: determine a string length of the current mount point, and create an in-memory record associated with the symbolic link, the in-memory record comprising the string length of the current mount point associated with the symbolic link;
   receive a request to utilize the symbolic link;
   read the in-memory record in response to receiving the request to utilize the symbolic link;
   replace the target mount point in the symbolic link with the current mount point to form a modified absolute path; and
   return the modified absolute path.

2. The computer program product as recited in claim 1, wherein the program code for verifying that the target mount point is identical to the current mount point comprises program code readable/executable by the processor to:
   compare a string length of the target mount point to a string length of the current mount point;
   determine that the target mount point is not identical to the current mount point in response to a determination that the string length is different; and
   determine that the target mount point is not identical to the current mount point in response to a determination that the string length is the same and a content of the current mount point is different from a content of the target mount point.

3. The computer program product as recited in claim 1, wherein the program code is further readable/executable by the processor to update the in-memory record of the symbolic link in response to a change to the current mount point of the target by:
   determining a string length of the current mount point, and
   updating the in-memory record of the symbolic link with the string length of the current mount point.

4. The computer program product as recited in claim 1, wherein the program code is further readable/executable by the processor to:
   receive a second request to utilize a second symbolic link that references a second target;
   determine whether an in-memory record exists for the second symbolic link;
   determine whether the in-memory record for the second symbolic link is empty in response to determining that the in-memory record for the second symbolic link exists;
   in response to a determination that the in-memory record for the second symbolic link is non-empty:
      replace a target mount point of a second absolute path of the second target with a current mount point of the second target to form a second modified absolute path; and
      return the second modified absolute path.

5. The computer program product as recited in claim 4, wherein the program code is further readable/executable by the processor to:
   in response to a determination that the in-memory record for the second symbolic link is empty:
      return the second absolute path.

6. The computer program product as recited in claim 1, wherein the program code is further readable/executable by the processor to store a length of a media identifier to the in-memory record in response to a determination that the symbolic link includes the media identifier.

7. The computer program product as recited in claim 1, wherein a plurality of in-memory records are stored for a plurality of symbolic links, each updated in-memory record indicating a current mount point for its associated target, and wherein the target comprises at least one file and/or at least one directory stored on media of a storage system.

8. A computer program product for using dynamic absolute-path symbolic links, the computer program product comprising a non-transitory computer readable storage medium having computer program code embodied therewith, the program code readable/executable by a processor to:
   receive a request to utilize a symbolic link which references a target using an absolute path, the absolute path comprising a target mount point and a name of the target;
   determine whether an in-memory record exists for the symbolic link;
   in response to a determination that the in-memory record exists and is empty, return the absolute path;
   in response to a determination that the in-memory record does not exist, return the absolute path; and
   in response to a determination that the in-memory record exists and is non-empty: replace the target mount point from the absolute path with a current mount point to form a modified absolute path and return the modified absolute path.

9. The computer program product as recited in claim 8, wherein the program code is further readable/executable by the processor to:
   receive indication of the symbolic link, the indication including the absolute path of the target;
   identify the current mount point of the target;
   verify that the target mount point is identical to the current mount point; and
   in response to a determination that the target mount point is identical to the current mount point:
      determine a string length of the current mount point; and
      create the in-memory record for the symbolic link, the in-memory record comprising the string length of the current mount point associated with the symbolic link.

10. The computer program product as recited in claim 9, wherein the program code for verifying that the target mount point is identical to the current mount point comprises program code readable/executable by the processor to:
   compare a string length of the target mount point to a string length of the current mount point;
   determine that the target mount point is not identical to the current mount point in response to a determination that the string length is different; and
   determine that the target mount point is not identical to the current mount point in response to a determination that the string length is the same and a content of the current mount point is different from a content of the target mount point.

11. The computer program product as recited in claim 9, wherein the program code is further readable/executable by the processor to store a length of a media identifier to the in-memory record in response to a determination that the symbolic link includes the media identifier.

12. The computer program product as recited in claim 8, wherein the program code is further readable/executable by the processor to add a media identifier to the modified absolute path in response to a determination that the in-memory record comprises the media identifier.

13. The computer program product as recited in claim 8, wherein the program code is further readable/executable by the processor to update the in-memory record of the symbolic link in response to a change to the current mount point of the target by:
   determining a string length of the current mount point, and
   updating the in-memory record of the symbolic link with the string length of the current mount point.

14. The computer program product as recited in claim 8, wherein a plurality of in-memory records are stored for a plurality of symbolic links, each updated in-memory record indicating a current mount point for its associated target, and wherein the target comprises at least one file and/or at least one directory stored on media of a storage system.

15. A computer-implemented method for providing dynamic absolute-path symbolic links, the method comprising:
   receiving a request to utilize a symbolic link which references a target using an absolute path with an outdated target mount point;
   determining whether an in-memory record exists for the symbolic link;
   determining whether the in-memory record is empty in response to determining that the in-memory record exists;
   in response to determining that the in-memory record is non-empty: replacing the outdated target mount point from the absolute path with a current mount point to form a modified absolute path, and returning the modified absolute path;
   in response to determining that the in-memory record exists and is empty, returning the absolute path from the symbolic link; and
   in response to determining that the in-memory record does not exist, returning the absolute path from the symbolic link.

16. The computer-implemented method as recited in claim 15, comprising:
   comparing a string length of the outdated target mount point to a string length of the current mount point for determining whether the outdated target mount point is not identical to the current mount point.

17. The computer-implemented method as recited in claim 16, comprising storing a length of a media identifier to the in-memory record in response to a determination that the symbolic link includes the media identifier.

18. The computer-implemented method as recited in claim 15, comprising adding a media identifier to the modified absolute path in response to a determination that the in-memory record comprises the media identifier.

* * * * *